United States Patent [19]

Massengill

[11] Patent Number: 4,693,506
[45] Date of Patent: Sep. 15, 1987

[54] COMBINATION AIR FAIRING AND AUXILIARY AIR BRAKING DEVICE

[76] Inventor: Arnold R. Massengill, Rte. 2, Box 194A, New Tazewell, Tenn. 37825

[21] Appl. No.: 860,078

[22] Filed: May 6, 1986

[51] Int. Cl.$^4$ .......................................... B62D 35/00
[52] U.S. Cl. ..................................................... 296/1 S
[58] Field of Search ....................... 296/1 S; 188/270; D12/181; 180/903

[56] References Cited

U.S. PATENT DOCUMENTS

| | | | |
|---|---|---|---|
| 3,711,146 | 1/1973 | Madzsar et al. | 296/1 S |
| 4,457,558 | 7/1984 | Ishikawa | 296/1 S |
| 4,462,628 | 7/1984 | Gregg | 296/1 S |
| 4,465,154 | 8/1984 | Hinderks | 296/1 S |
| 4,611,796 | 9/1986 | Orr | 296/1 S |

*Primary Examiner*—Robert R. Song
*Attorney, Agent, or Firm*—Pitts and Brittian

[57] ABSTRACT

A combination air fairing and auxiliary braking device (10) for use in connection with trucks, vans, trailers, or the like vehicles. The device (10) includes an air fairing structure (14) which serves to produce a preselected outline and reduce the drag resulting from air resistance during motion of the vehicle (12). A plurality of relief doors (16) are carried by the air fairing structure (14), and are operable between closed and opened positions such that the drag is reduced when the relief doors (16) are closed, and the drag is increased when the relief doors (16) are opened. A system (40) is provided for selectively opening and closing the relief doors (16) at preselected time. For example, the relief doors (16) are open to increase the drag as a vehicle is slowing down to provide auxiliary braking forces.

20 Claims, 4 Drawing Figures

COMBINATION AIR FAIRING AND AUXILIARY AIR BRAKING DEVICE

DESCRIPTION

1. Technical Field

This invention relates generally to air fairing systems, and more particularly concerns such a system which incorporates relief doors to selectively provide auxiliary braking forces.

2. Background Art

Air fairing systems are provided for trucks and other vehicles to make them more aerodynamic and increase fuel efficiency. An aerodynamic vehicle requires additional braking power in order to stop its motion. Accordingly, the braking systems on aerodynamic vehicles wear out quicker, require more maintenance, and may be dangerous in cases where such systems are marginal.

Known prior art devices which incorporate systems for producing increased drag for providing auxiliary braking of vehicles are described in the following U.S. Pat. Nos. 2,149,161; 2,979,165; 3,791,468; and 4,160,494. Generally, these devices disclose various embodiments of movable parts which can be positioned in a manner such that air resistance is increased upon actuation of the devices. However, none of the known devices illustrate auxiliary air braking systems which are combined with air fairing systems commonly used on trucks or other vehicles.

Accordingly, it is an object of the present invention to provide a combination air fairing and auxiliary braking system which can be selectively operated to increase the drag during braking operations and reduce the drag during regular high speed motion of the vehicle.

Another object of the present invention is to provide such a combination device which includes a plurality of relief doors that are selectively operated between the opened and closed positions automatically by the driver upon movement of the brake pedal.

Another object of the present invention is to provide such combination air fairing and auxiliary braking device which can be easily maintained and readily installed in retrofit applications.

DISCLOSURE OF THE INVENTION

Other objects and advantages will be obvious, and will in part appear hereinafter, and will be accomplished by the present invention which provides a combination air fairing and auxiliary braking system for use in connection with trucks, vans, trailers, or the like vehicles. The device of the present invention includes an air fairing structure which serves to produce a preselected outline for reducing the drag resulting from air resistance. This air fairing structure is normally mounted on the cab of a truck, or at a selected location on other vehicles. A plurality of relief doors are carried by the air fairing structure, and operable between the closed and opened positions such that the drag is selectively reduced when the relief doors are closed, and the drag is increased when the relief doors are open. A control system is provided for selectively opening and closing the relief doors. In the preferred embodiment, this control system is operatively associated with the brake pedal and/or the accelerator pedal such that the device is automatically energized to increase the drag upon depression of the brake pedal by the driver.

BRIEF DESCRIPTION OF THE DRAWINGS

The above-mentioned features of the present invention will be more clearly understood from consideration of the following description in connection with the accompanying drawings in which.

BEST MODE FOR CARRYING OUT THE INVENTION

Figure 1:
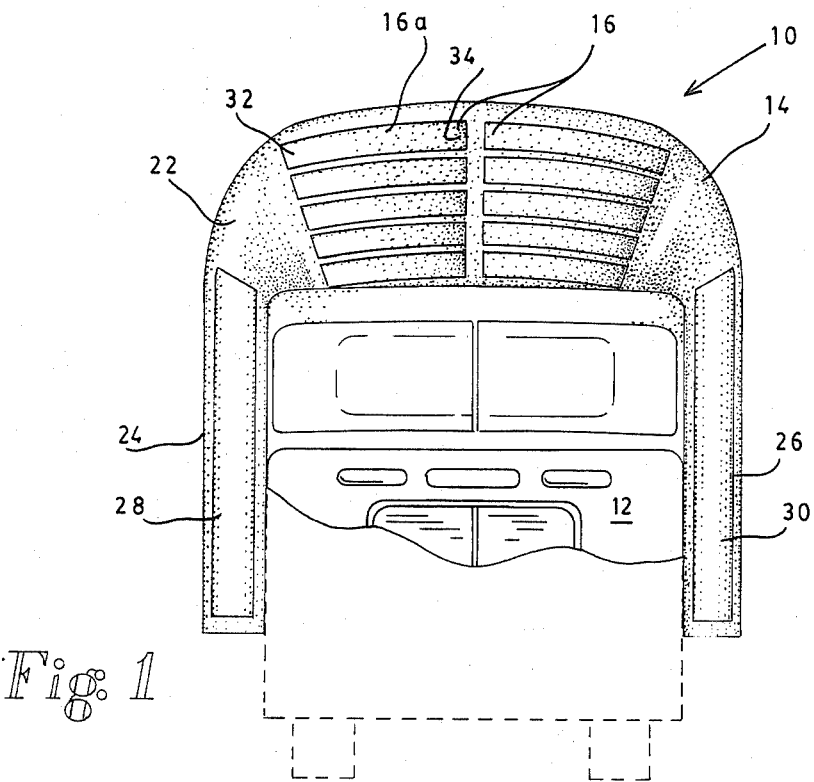
FIG. 1 is a front view of an air fairing and auxiliary braking device constructed in accordance with various features of the present invention mounted on the cab of a truck.

Referring now to the figures, a combination air fairing and auxiliary braking device for use in connection with trucks, vans, trailers, and the like vehicles, is illustrated generally at 10 in FIG. 1. This device 10 can be mounted on the vehicle, such as the cab of a truck 12, or it can be integrally formed with the cab or vehicle for which it is operatively associated. While the integral formation of an air fairing system of the type disclosed has not yet been accomplished, it is within the spirit and scope of the present invention that such a system can be integrally formed with the vehicle at the time of its being manufactured.

The device 10 includes an air fairing structure 14 which serves to produce a preselected outline to reduce the drag resulting from air resistance as a vehicle, such as the truck 12, is driven. It will be recognized by those skilled in the art that the configuration of the air fairing structure 14 can vary with the vehicle to which it is applied. For example, an alternate embodiment or configuration of an air fairing structure is illustrated at 14' in FIG. 3.

Figure 4:
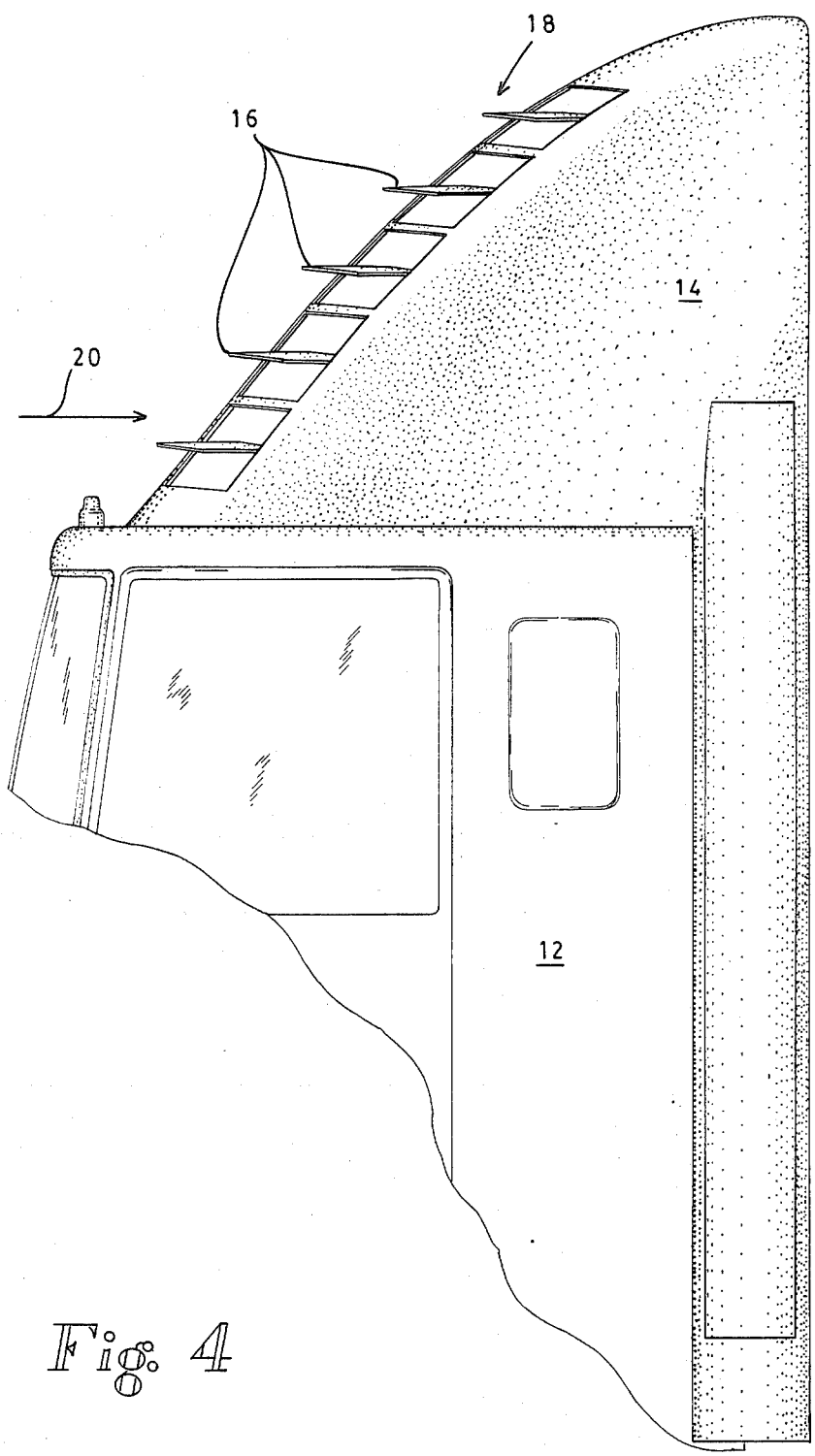
FIG. 4 is an elevation view of the device showing the relief doors on the portion of the air fairing system above the cab in their open positions.

A plurality of relief doors 16 are carried by the air fairing structure 14. These relief doors 16 are operable between closed and opened positions such that the drag is reduced when the relief doors are closed as shown in FIG. 1, and the drag is increased when the relief doors are opened as is shown in FIG. 4 at 18. In this connection, when the relief doors are opened, as shown in FIG. 4, air passes through the doors 16 in the direction of the arrow, and will strike the trailer being pulled by the truck 12. In this connection, auxiliary braking forces are applied by opening the relief doors 16.

In the air fairing structure depicted in FIG. 1, three sections are provided. The first section 22 represents the portion of the air fairing structure positioned above the cab of the truck 12. The second section 24, and the third section 26, are positioned on opposite sides of the truck cab, and extend downwardly from the opposite sides of the section 22 of the structure 14. These downwardly depending sections 24 and 26 assist in providing an air fairing outline proximate the sides of the truck cab. In this connection, the drag normally associated by air resistance striking the trailer proximate the sides of a cab are reduced. It will also be noted that as desired, relief doors or flaps 28 and 30 are operatively associated with the sections 24 and 26, respectively, of the air fairing structure 14. These relief doors, or flaps, associated with the sections of the air fairing structure extending along the sides of the cab are operable between their opened and closed positions in a manner similar to the operation of the relief doors 16, as will be described in greater detail hereinafter.

In a preferred embodiment, the opposite ends such as the ends 32 and 34 of relief door 16A are rotatably mounted in the juxtaposed portions of the air fairing structure. Various known structures or devices can be used to accomplish this rotatable mount. For example, each of the ends of each of the relief doors 16 can be provided with a suitable pin 17 (see FIG. 2) which is received in an operatively associated standard (not shown) carried by the juxtaposed portions of the air fairing structure. This standard can carry an opening in which the associated pin is journalled. Other means can be provided as necessary or desired for rotatably mounting the relief doors on the structure 14. Also, it should be recognized that the relief doors could be moved from their opened to their closed positions, and vice versa, by sliding if necessary or desired.

Similarly, the relief doors or flaps 28 and 30 are rotatably mounted on the sections 24 and 26, respectively, of the air fairing structure 14. These relief doors 28 and 30 will be rotatably mounted at their upper and lower end portions, respectively, in a manner similar to that described above in connection with relief doors 16.

Figure 2B:
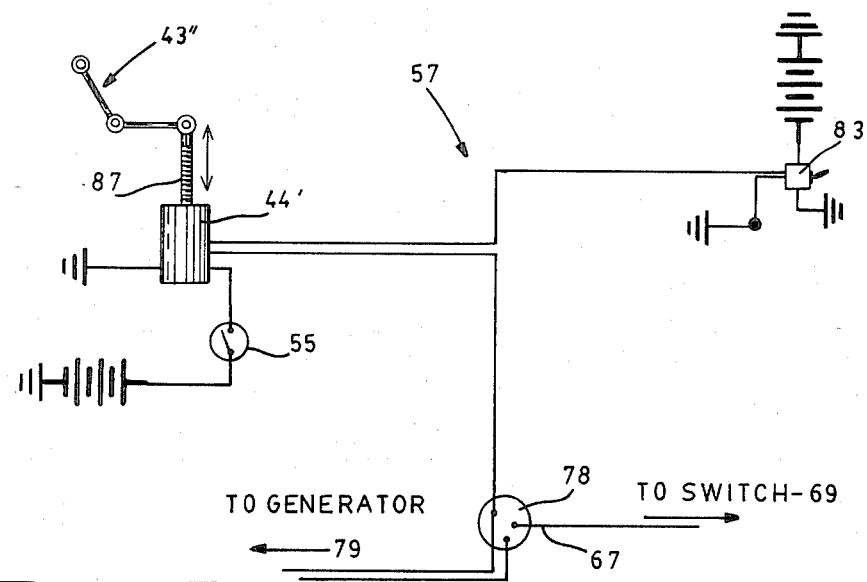
FIG. 2 is a schematic view of a control system for selectively opening and closing the relief doors of the device.
Figure 2A:
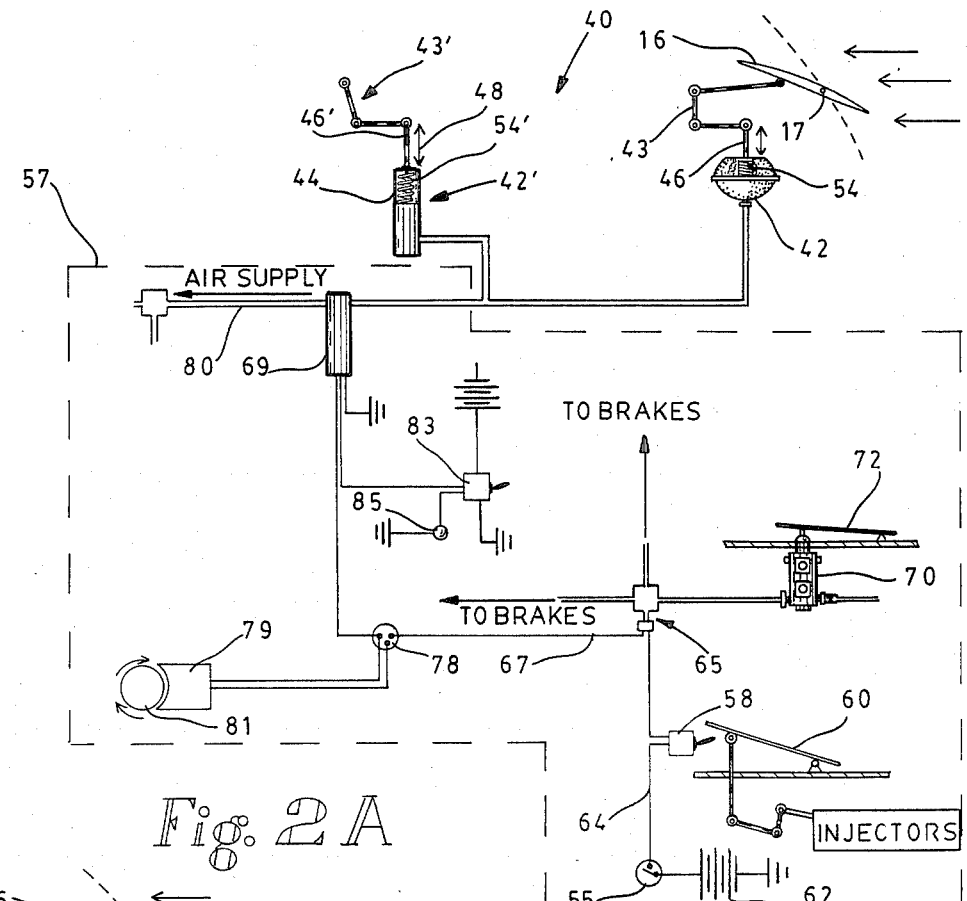
Figure 3:
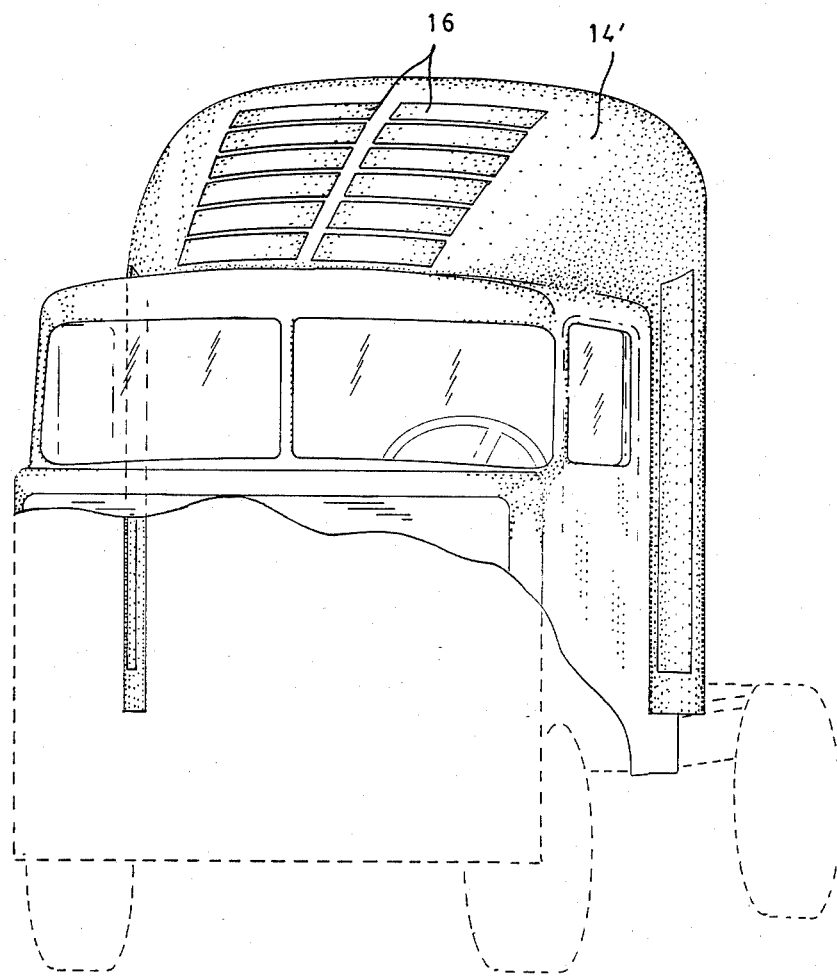
FIG. 3 is an alternate embodiment of the system constructed, in accordance with various features of the present invention.

As illustrated in FIGS. 1 and 3, the relief doors illustrated are of variable sizes. For example, the relief doors proximate the cab are of smaller size than the relief doors proximate the top of the air fairing structure. Further, the relief doors or flaps mounted on the side sections and 26 are of greater size than the relief doors 16 carried above the cab. As necessary, or desired, however, the relief doors may be of the same size. Means are provided for selectively opening and closing the relief doors to apply and terminate the auxiliary braking forces. A suitable system serving to selectively open and close the relief doors is illustrated generally at 40 in FIG. 2A. More specifically, the system 40 comprises an actuator 42 which is mechanically connected through the linkage members 43 with the relief doors 16 for selectively moving such doors from their closed to their opened positions and back. An optional actuator depicted at 42' in the depicted embodiment, comprises a cylinder 44 having an operatively associated piston arm 46' which reciprocally moves in the direction of the arrow 48. When the piston arm 46 is extended fully, the relief doors are moved to their opened position as illustrated in FIG. 4. In this connection, the end of the piston arm is mechanically connected to linkage members 43' which are operatively associated with each of the relief doors to be actuated by the actuator 42'. These linkage members 43' (and the members 43) can be mechanically joined with the doors to be operated such that movement of the piston arm 46 in an outwardly direction causes the linkage members to apply opening forces to the doors. Movement of the linkage members 43' and 43 in the reverse direction will cause the doors to move to their closed positions. It will, of course, be recognized that a plurality of actuators 42' in the optional system, which comprise the cylinders 44, can be provided at various locations to assure proper opening of each of the doors of the device 10 upon operation of the system 40. For example, separate actuators 42 and/or 42' will be provided for the relief doors or flaps 28 and 30 carried by the sections 24 and 26, respectively.

In the device depicted in FIG. 2A, the optional actuator 42', comprising the cylinder 44, of conventional design, and which is fluid operated such that the application of the fluid to the cylinder 44 causes the piston arm 46' to extend, thereby opening the doors. In accordance with another feature of the present invention, spring biasing means diagrammatically indicated at 54' in FIG. 2A can serve to assist in movement of the doors to their closed positions upon completion of the need for, or application of, the auxiliary braking forces. In this regard, the spring biasing means 54' can comprise a spring having one end portion interconnected with a piston 46 with its opposite end mounted at a suitable location in the cylinder 44 as shown.

Similarly, the actuator 42 comprises a diaphragm air chamber with an internal return spring 54 which is of conventional design. This device is fluid operated such that the application of fluid to the cylinder 44 causes the piston arm 46' to extend, thereby opening the door 16 operatively associated therewith. The spring biasing means 54 serves to move the doors to their closed position upon completion of the need for the application of the auxiliary breaking forces.

Control means 57 are provided for selectively energizing the actuator means 42 and/or the optional actuator 42'. In the illustrated embodiment, the control means comprises a first control switch 58 which is operatively associated with the accelerator pedal 60 as illustrated diagrammatically in FIG. 2A. Control switch means 58 comprises an electrical switch depicted diagrammatically which is positioned such that release of the accelerator pedal activates the switch and energizes the control system for selectively opening and closing the relief doors. In this connection, the battery 62 is connected through the ignition switch 55 and the line 64 to a pressure sensitive switch 65 which prevents actuation of the actuator 44, unless the brake pedal 72 is depressed. Upon applying the brakes air pressure, hydraulic pressure or mechanical pressure makes the pressure sensitive switch complete the circuit to the speed limiting switch 78.

More specifically, line 64 is connected to a pressure sensitive switch 65 which allows a connection between line 65 and line 67 if the foot brake pedal is depressed. In this event, power is supplied through line 67 to the magnetic switch valve 69 this valve in turn allows air to be supplied through the feed line 71 to the actuator 42 and/or 42'. This operation of the valve 69 causes the relief doors to be opened as described above.

Thus, the control illustrated at 70 is operatively associated with the brake pedal 72. Upon depression of the brake pedal, after release of the accelerator pedal 60, switch 65 is operated which is connected through the line 67 to the actuator 42. Thus, upon depression of the brake pedal 72, the actuators are energized such that the piston arm 46 is extended to open the relief doors. Upon release of the brake pedal 72, the actuator 42 is deenergized and the doors are closed as described hereinabove. It will be recognized that the pressure sensitive switch 65 serves to prevent the fluid or hydraulic operation of the actuator 42 until the brakes are applied.

In accordance with other features of the present invention, a speed control or limiting switch 78 and a manual override switch 83 are provided. The speed control switch 78 is serially connected in line 67 and serves to prevent the relief doors from opening at speeds below a preselected threshold value. For example, it may be desirable to prohibit opening and closing of the doors at speeds below 40-45 mph. In this connection, a pulsating generator 79 is driven by a rotating component 81 of the drive train such that switch 78 is controlled by the selected speed of the vehicle. The pulsating generator will not supply the needed voltage to complete the electrical circuit to the magnetic switch valve 69 until the predetermined speed is reached.

In summary, the energizing switch 58 is mounted in the accelerator linkage system. It gets power from the run side of the ignition switch 55. When the accelerator pedal 60 is released, power is supplied to a pressure sensitive contact switch 65 mounted in the service side of the vehicles brake system. When the service brakes are applied, air pressure, fluid pressure, or mechanical pressure makes the pressure sensitive contact switch 65 complete the circuit to the speed limiting switch 78. The speed limiting switch 78 keeps the circuit open below a predetermined speed. This is accomplished by means of a pulsating generator 79 mounted in the vehicle's drive train. The pulsating generator will not supply the needed voltage to complete the electrical circuit to the magnetic switch valve until the predetermined speed is reached.

Another means of controlling the speed limiting switch is through a pressure sensitive switch mounted on the outside of the air fairing or truck cab. This switch calculates the speed of the vehicle by the amount of pressure exerted against it while the vehicle is in motion. While the vehicle speed is above the predetermined speed, the switch completes the circuit to the magnetic switch valve or the electric motor.

Further, a manual override switch 83 is provided such that the doors can be selectively opened and closed manually by an operator, as for example, when a truck is being pulled in a direction reverse that of its normal travel. This manual override switch 83 is connected to the magnetic switch valve 69 for overriding this valve 10 allowing manual operation of the actuators 42 and/or 42'. A suitable indicator light 85 is connected to switch 83.

In the preferred embodiment, air (or another suitable fluid) is supplied for movement of the cylinder actuator 44 from the air supply line 80 which is connected to the horn of a truck in one embodiment. As necessary, or desired, another suitable supply can be provided.

In the alternate embodiment shown in FIG. 2B, an electric motor 44' is connected to the control circuit 57 with like numerals referring to like components. This motor serves to electrically drive the worm gear 87 to operate the linkage members 43" for movement of the doors in a manner described above in connection with control means 57. Here the magnetic switch valve is not needed, as will be recognized by those skilled in the art. The electrical motor 44' is of the type which can rotate in either direction. Power from the run side of the ignition switch 55 is supplied at all times to the circuit of the motor which rotates it in the direction that would close the relief doors 16 or flaps. When the pressure sensitive contact switch 65 completes the circuit, it causes the motor 44' to rotate in the direction that opens the relief doors or flaps. When the circuit is broken by the pressure sensitive contact switch, the afore mentioned circuits take over again automatically.

If the system uses air or fluid pressure, the magnetic switch valve 69 is the final point of the electrical control circuit 57. The magnetic switch valve 69 is an electrically controlled gate valve of conventional design. When power reaches the magnetic switch valve, a coil is energized, pulling the plunger away from its seat in the valve. This allows the pressure to pass through the valve to the cylinder 44 or chamber 42'. The pressure pushes the plunger or piston out of the cylinder or chamber, causing the mechanical linkage to open the relief doors or flaps. When the service brakes are released, the pressure drops at the pressure sensitive contact switch. This causes the electrical circuit to be broken, allowing a spring in the magnetic switch valve to push the plunger to its seat in the valve, shutting off the pressure source. Spring action either in the cylinder or chamber, or connected to the mechanical linkage causes the relief doors or flaps to snap shut.

Figure 2C:
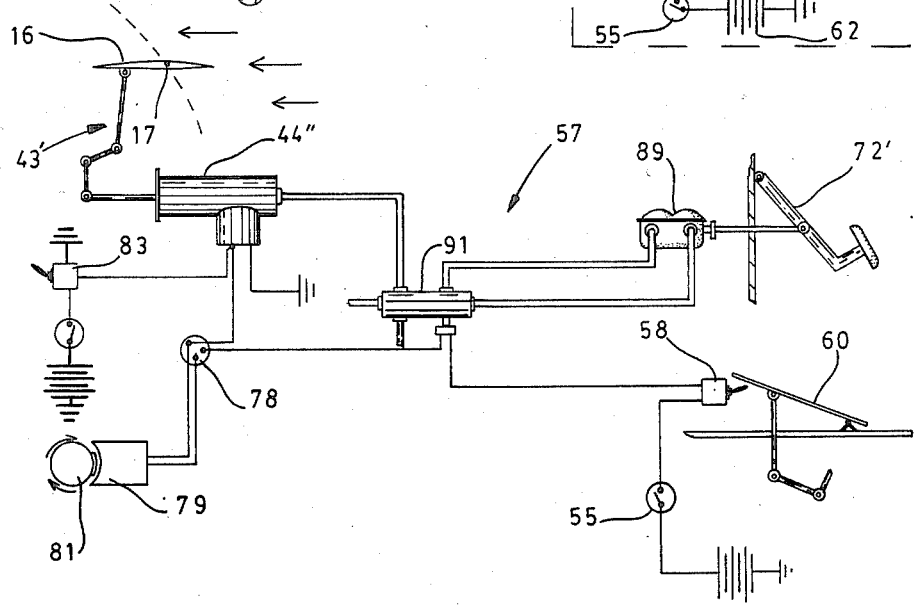

FIG. 2C illustrates a further alternate embodiment of the control means at 57. In this embodiment, like numerals refer to like parts referenced above and primed numerals refer to alternate parts which function in a manner similar to that described above. In the embodiment depicted in FIG. 2C, a master cylinder 89 actuated by the brake pedal 72' is connected directly through a pressure differential valve 91 to the slave cylinder 44" which actuates the linkage members 43' for operation of the relief doors 16. Thus, the physical movement of the brake pedal 72' causes the slave cylinder to be activated for operation of the doors.

While the above schematic diagrams has been described and illustrated diagrammatically, it will be recognized by those skilled in the art that the various switches, controls and mechanical connections can be varied as necessary or desired to fit particular applications and types of vehicles upon which such system is mounted.

It will be recognized by those skilled in the art that an improved combination air fairing and auxiliary braking device has been provided. This device can be readily mounted on state-of-the-art vehicles such as trucks, trailers, or the like. The device has a plurality of relief doors which can be selectively opened and closed to increase and reduce the air resistance associated with movement of the vehicle as desired. The device is designed such that it can be integrally formed with the vehicle for which it is operatively associated or mounted thereon for retrofit applications.

Thus, although there has been described to this point particular embodiments of the present invention of a combination air fairing and auxiliary braking device, it is not intended that such specific references be considered as limitations upon the scope of this invention, except insofar as set forth in the following claims and equivalents thereof.

I claim:

1. A combination air fairing and auxiliary air braking device for use in connection with trucks, vans, trailers or like vehicles having a cab and an upstanding surface to the rear of said cab extending above said cab, said device comprising:

an air fairing structure positioned upon the top of said cab which serves to produce a preselected outline and reduce aerodynamic drag upon said upstanding surface resulting from air resistance to movement of said vehicle, said air fairing structure provided with a plurality of openings in a frontal portion thereof, said openings positioned between a front edge and a rear edge of said air fairing structure;

a plurality of relief doors carried by said air fairing structure, each relief door associated with one of said openings for selectable operation between closed and opened positions such said drag is reduced when said relief doors are closed and said drag is increased when said relief doors are opened due to impingement of air flow upon said upstanding surface; and means for selectively and rapidly opening and closing said relief doors.

2. The device of claim 1 wherein said device further includes a section for extending downwardly on opposite sides of ssaid cab, and wherein each said downwardly extending section is provided with at least one vertically oriented opening, said downwardly extending section further including at least one relief door associated with each said opening operable between closed and opened positions to selectively reduce and increase said drag on said vehicle, respectively.

3. The device of claim 1 wherein said relief doors are each rotatably mounted from opposite ends in said openings in said air fairing structure and operable between said opened and closed positions.

4. The device of claim 2 wherein said at least one relief door in said downwardly extending sections is rotatable mounted from opposite ends in each of said downwardly extending sections.

5. The device of claim 1 wherein said relief doors are of various sizes.

6. The device of claim 1 wherein said air fairing structure is integrally formed with said cab of said vehicle with which it is operatively associated.

7. The device of claim 2 wherein said downwardly extending sections are integrally formed with said cab.

8. The device of claim 1 wherein said means for selectively opening and closing said relief doors comprise actuator means mechanically connected with said relief doors for selectively moving said relief doors from their closed to their opened positions and back, and control means for selectively energizing said actuator means.

9. The device of claim 8 wherein said actuator means comprises a fluid operated cylinder and a reciprocatable piston arm means mechanically connected to said relief doors whereby actuation of aid cylinder and piston arm means causes said relief doors to open, said actuator means further including spring biasing means for biasing said relief doors towards their closed positions when said cylinder and piston arm means is de-activated to cause said relief doors to close.

10. The device of claim 9 wherein said control means includes a first control operatively associated with the accelerator whereby release of said accelerator activates said means for selectively opening and closing said relief doors, and a further control operatively associated with a brake pedal in said vehicle whereby depression of said brake pedal energizes said cylinder means and causes said relief doors to move to their opened position.

11. The device of claim 8 including speed control means which prevents said relief doors from opening at speeds below a preselected threshold speed.

12. The device of claim 8 including override means which allows manual operation of said means for selectively opening and closing said relief doors.

13. A combination air fairing and auxiliary air braking device for use in connection with trucks, vans, trailers or like vehicles having a cab and an upstanding surface to the rear of said cab extending above said cab, said device comprising:

an air fairing structure positioned upon the top of said cab which serves to produce a preselected outline and reduce aerodynamic drag upon said upstanding surface resulting from air resistance to movement of said vehicle, said air fairing structure provided with a plurality of transversely oriented openings in a frontal portion thereof, said openings located between a front and a rear edge of said air fairing structure;

a plurality of relief doors pivotally carried by said air fairing structure, each relief door associated with one of said openings, for selectable operation between closed and opened positions such that said drag is reduced when said relief doors are closed and said drag is increased when said relief doors are opened due to impingement or air flow upon said upstanding surface; and means for selectively said rapidly opening and closing said relief doors comprising actuator means mechanically connected with said relief doors for selectively moving said relief doors from their closed to their opened positions and back, and control means for selectively energizing said actuator means, said control means including a first control element operatively associated with an accelerator of said vehicle whereby a release of said accelerator activates said actuator means, and a further control element operatively associated with a brake pedal in said vehicle whereby depression of said brake pedal energizes said actuator means and causes said relief doors to move to their opened position.

14. The device of claim 13 wherein said relief doors are each rotatable mounted from opposite ends in said openings in said air fairing structure and operable between said opened and closed positions.

15. The device of claim 13 wherein said relief doors are of various sizes.

16. The device of claim 13 wherein said air fairing structure is integrally formed with a vehicle with which it is operatively associated.

17. The device of claim 13 wherein said actuator means comprises fluid operated cylinder and reciprocatable piston arm means mechanically connected to said relief doors whereby activation of said cylinder and piston arm means causes said relief doors to open, said actuator means further including spring biasing means for biasing said relief doors towards their closed positions when said cylinder and piston arm means is de-activated.

18. The device of claim 1 wherein said air fairing structure is provided with at least three transversely oriented openings between said front and rear edges and with at least three relief doors, with one relief door associated with each of said openings, adapted to be moved from a closed position to an open position to affect said drag.

19. The device of claim 13 further including a downwardly extending section positioned on opposite sides of said cab, each said downwardly extending section provided with a vertically oriented opening, and with a relief door associated with each of said openings operable between a closed positon and an open position with said means for selectively openings and closing said relief doors of said air fairing structure on said top of said cab.

20. A combination air fairing and auxiliary air braking device for use in connection with trucks, vans, trailers or like vehicles having a cab and an upstanding surface to the rear of said cab and extending above said cab, said device comprising:

an air fairing structure positioned upon the top of said cab which serves to produce a preselected outline and reduce aerodynamic drag upon said upstanding surface resulting from air resistance to movement of said vehicle, said air fairing structure provided with at least three transversely oriented openings in a frontal portion thereof, said openings located between a front and a rear edge of said air fairing structure;

at least three relief doors, one of said doors operatively associated with each of said openings, each of said relief doors pivotally mounted for selected horizontal rotation between a closed position and an open position such that said drag is reduced when said relief doors are closed and said drag is increased when said relief doors are opened due to impingement of air flow upon said upstanding surface; and actuator means connected to said relief doors, for rapidly opening and closing said relief doors, said actuator means comprising a cylinder having a reciprocatable piston arm, a control means connected to said cylinder to actuate said cylinder and said arm, said control means including signal initiation means connected with each an accelerator pedal, a brake pedal and a speed sensing device within said cab whereby said relief doors are opened when said accelerator pedal is released or said brake pedal is depressed unless said speed sensing device indicates a speed below a preselected threshold speed.

* * * * *